(12) United States Patent
Okuda et al.

(10) Patent No.: US 12,554,898 B2
(45) Date of Patent: Feb. 17, 2026

(54) MEMORY SYSTEM

(71) Applicant: Kioxia Corporation, Tokyo (JP)

(72) Inventors: Kohei Okuda, Koganei Tokyo (JP); Hayato Fujiwara, Yamato Kanagawa (JP); Tatsuya Hosokawa, Minato Tokyo (JP); Hiroyasu Nakatsuka, Machida Tokyo (JP); Ge Wang, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 255 days.

(21) Appl. No.: 18/168,211

(22) Filed: Feb. 13, 2023

(65) Prior Publication Data

US 2023/0385462 A1 Nov. 30, 2023

(30) Foreign Application Priority Data

May 25, 2022 (JP) .................... 2022-084887

(51) Int. Cl.
G06F 21/81 (2013.01)
G06F 13/16 (2006.01)
G11C 16/06 (2006.01)

(52) U.S. Cl.
CPC .............. *G06F 21/81* (2013.01); *G06F 13/16* (2013.01); *G11C 16/06* (2013.01)

(58) Field of Classification Search
CPC .......... G06F 21/81; G06F 13/16; G11C 16/06
USPC .................................................. 365/185.29
See application file for complete search history.

(56) References Cited

U.S. PATENT DOCUMENTS

| 7,936,603 | B2 | 5/2011 | Merry et al. | |
|---|---|---|---|---|
| 9,811,273 | B1* | 11/2017 | Brahmadathan | G06F 3/0619 |
| 11,133,074 | B1* | 9/2021 | Li | G11C 16/3472 |
| 2009/0031095 | A1* | 1/2009 | Merry, Jr. | G11C 16/22 |
| | | | | 711/E12.001 |
| 2017/0052739 | A1* | 2/2017 | Terada | G06F 3/0659 |
| 2019/0066799 | A1* | 2/2019 | Luo | G11C 16/08 |
| 2019/0180800 | A1* | 6/2019 | Kawano | G11C 16/32 |
| 2019/0392153 | A1* | 12/2019 | Le Gargean | G06F 21/62 |
| 2020/0064897 | A1* | 2/2020 | Nomura | G11C 5/144 |
| 2021/0096773 | A1* | 4/2021 | Seong | G11C 16/30 |
| 2022/0020439 | A1* | 1/2022 | Stoller | G11C 16/26 |
| 2022/0028460 | A1* | 1/2022 | Kurose | G06F 3/0604 |
| 2022/0246222 | A1* | 8/2022 | Stoller | G11C 16/349 |

FOREIGN PATENT DOCUMENTS

| JP | 2006-172384 A | 6/2006 |
|---|---|---|
| JP | 2007-066008 A | 3/2007 |

* cited by examiner

*Primary Examiner* — Alexander Sofocleous
*Assistant Examiner* — Duy H Luong
(74) *Attorney, Agent, or Firm* — Foley & Lardner LLP (57) ABSTRACT

A memory system includes a first controller, a nonvolatile memory connected to the first controller, and a power supply circuit that applies a voltage to the first controller and the nonvolatile memory. The first controller writes first data to a first address in the nonvolatile memory and instructs the power supply circuit to apply the destruction voltage to the nonvolatile memory. The first controller determines whether the first data can be correctly read from the first address in the nonvolatile memory and checks destruction of the nonvolatile memory based on the determination.

10 Claims, 5 Drawing Sheets

MEMORY SYSTEM

CROSS-REFERENCE TO RELATED APPLICATION

This application is based upon and claims the benefit of priority from Japanese Patent Application No. 2022-084887, filed May 25, 2022, the entire contents of which are incorporated herein by reference.

FIELD

Embodiments described herein relate generally to memory systems.

BACKGROUND

A memory system that includes a memory controller and a nonvolatile memory and that can be connected to a host has become widespread. When the memory system is discarded, there is a demand to make data written in a nonvolatile memory unreadable in a short period of time.

DETAILED DESCRIPTION

At least one embodiment provides a memory system that makes data written in a nonvolatile memory unreadable in a short period of time.

In general, according to at least one embodiment, a memory system includes a first controller, a nonvolatile memory connected to the first controller, and a power supply circuit that applies a voltage to the first controller and the nonvolatile memory. The first controller writes first data to a first address in the nonvolatile memory and instructs the power supply circuit to apply a destruction voltage to the nonvolatile memory. The first controller determines whether the first data can be correctly read from the first address in the nonvolatile memory and checks destruction of the nonvolatile memory based on the determination.

Embodiments will be described in detail below with reference to the accompanying drawings. It is noted that the present disclosure is not limited by this embodiment.

First Embodiment

Figure 1:
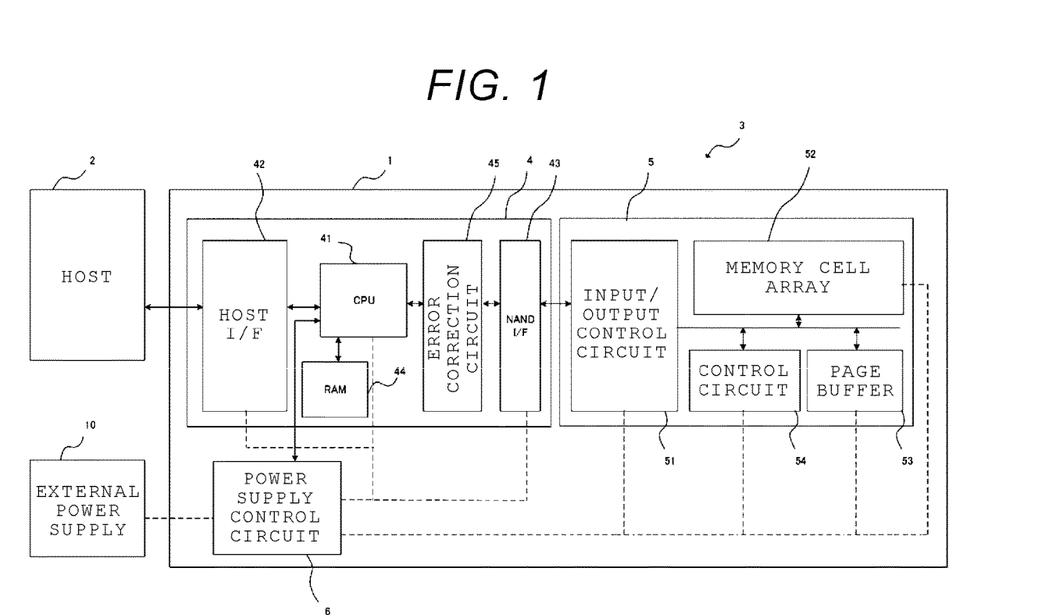
FIG. 1 is a block diagram of an information processing system including a memory system according to a first embodiment.

A basic configuration of an information processing system including a memory system according to a first embodiment will be described with reference to FIG. 1.

An information processing system 3 includes a memory system 1, a host 2, and an external power supply 10.

The host 2 is electrically connected to the memory system 1. The host 2 requests the memory system 1 to write or read data. The host 2 may be a storage server that stores a large amount of various data in the memory system 1 or may be a personal computer. A plurality of the memory systems 1 can be connected to the host 2.

The external power supply 10 is a power supply provided outside the memory system 1. The external power supply 10 is a device that supplies power to the memory system 1. An external power supply may be provided in the host 2.

The memory system 1 is a storage device configured to write data to and read the data from a nonvolatile memory. A case in which the memory system 1 is implemented as a solid state drive (SSD) is exemplified below. The memory system 1 may be implemented as, for example, a memory card or a universal flash storage (UFS) device.

The memory system 1 includes a controller 4, a nonvolatile memory 5, and a power supply control circuit 6. The controller 4 is an example of a first controller.

The nonvolatile memory 5 is a semiconductor memory device that stores data in a nonvolatile manner. The nonvolatile memory 5 is an example of a first memory. The nonvolatile memory 5 is, for example, a NAND flash memory. The nonvolatile memory 5 is hereinafter referred to as a NAND memory 5. The NAND memory 5 includes an input/output control circuit 51, a memory cell array 52, a page buffer 53, and a control circuit 54.

The input/output control circuit 51 communicates with the controller 4 by exchanging data with a NAND I/F 43 provided in the controller 4 described later.

The memory cell array 52 includes a plurality of blocks. Each of the plurality of blocks includes a plurality of memory cells. The block is a unit of erasing data. The block includes a plurality of pages. The page is a unit of reading and writing data.

The page buffer 53 stores data volatilely. The page buffer 53 is an example of a second volatile memory. For the page buffer 53, a static random access memory (SRAM) is used, but a dynamic random access memory (DRAM) may be used instead. The page buffer 53 temporarily stores the data to be written to memory cell array 52. In addition, the page buffer 53 also temporarily stores data read from the memory cell array 52.

Figure 2:
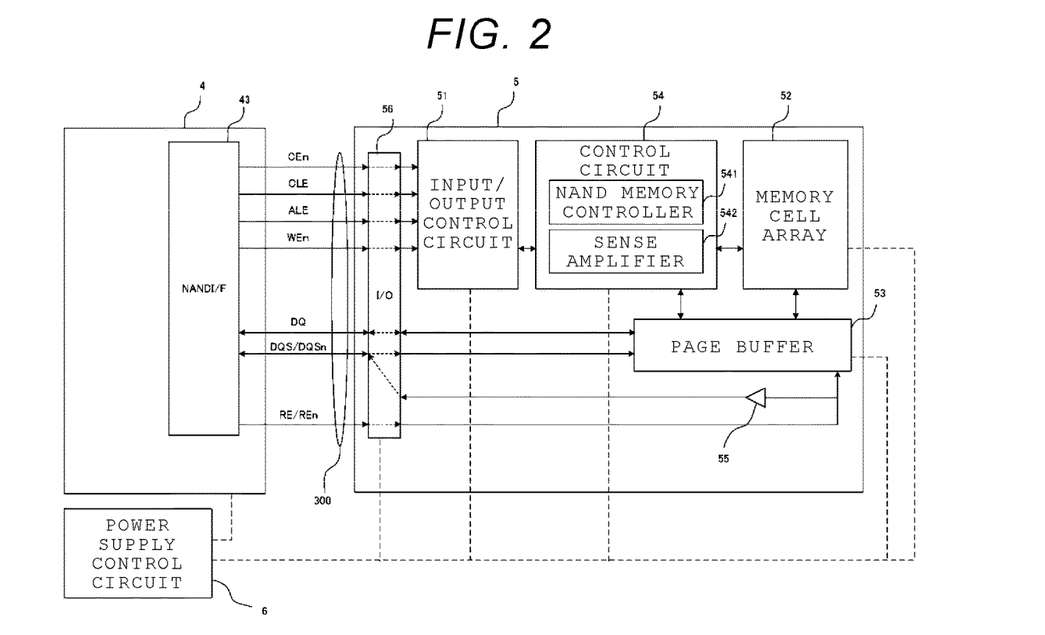
FIG. 2 is a block diagram of the memory system according to the first embodiment.

The control circuit 54 includes, for example, a NAND memory controller 541 and a sense amplifier 542 (refer to FIG. 2). The NAND memory controller 541 controls operations of the NAND memory 5. The NAND memory controller 541 writes the data to be written transmitted from the controller 4 from the page buffer 53 to the memory cell array 52. In addition, the NAND memory controller 541 transmits data read from the memory cell array 52 from the page buffer 53 to the controller 4. The sense amplifier 542 is a circuit that measures a current of a memory cell to which a voltage is applied and reads data. The NAND memory controller 541 is an example of a second controller.

The controller 4 functions as a memory controller configured to control the memory system 1. The controller 4 may be implemented by a circuit such as a system-on-a-chip (SoC). The controller 4 can process various commands from the host 2.

The controller 4 performs various processes based on firmware (FW) that is stored in the NAND memory 5, a read-only memory (ROM) (not illustrated) or the like in a nonvolatile manner. It is noted that dedicated hardware in the controller 4 may perform some or all of these processes.

The controller 4 controls the power supply control circuit 6. The controller 4 communicates with the power supply control circuit 6 via, for example, an inter-integrated circuit (I2C) bus.

The controller 4 includes a central processing unit (CPU) 41, a host interface (host I/F) 42, a NAND interface (NAND I/F) 43, a RAM 44, an error correction circuit 45, and the like. The CPU 41, the host I/F 42, the NAND I/F 43, the RAM 44, and the error correction circuit 45 may be connected to each other via a bus.

The CPU 41 implements various functions by executing FW stored in the NAND memory 5 or the like. The CPU 41 collectively controls the entire operations of the controller 4. As a part of controlling the entire operations of the controller 4, the CPU 41 determines an access destination to the NAND memory 5, types of accesses to the NAND memory 5, the order of accesses to the NAND memory 5, and the like. The types of the access are a write operation, a read operation, and the like.

The host I/F 42 includes a circuit for controlling communication with the host 2 and receiving commands. The host I/F 42 is an example of a first circuit. The memory system 1 is connected to the host 2 via host I/F 42. The host I/F 42 receives various commands, such as I/O commands from the host 2. The I/O commands include write commands and read commands. The host I/F 42 conforms to interface standards such as PCI Express (PCIe) (registered trademark) and NVM Express (NVMe) (registered trademark).

The NAND I/F 43 includes a circuit for transmitting and receiving commands and data to and from the NAND memory 5. The NAND I/F 43 is an example of a second circuit. The NAND I/F 43 electrically connects the controller 4 and the NAND memory 5. The NAND I/F 43 conforms to interface standards such as Toggle DDR and Open NAND Flash Interface (ONFI).

The RAM 44 is a semiconductor memory device that volatilely stores data. The RAM 44 is an example of a first volatile memory. The SRAM is used for the RAM 44, but the DRAM may be used instead. The RAM 44 temporarily stores firmware for operating of the CPU 41, the data to be written to the NAND memory 5, data read from the NAND memory 5, and the like. The RAM 44 may be provided outside the controller 4.

The error correction circuit 45 generates a parity for error correction by encoding the data to be written to the NAND memory 5 and generates a code word containing the data and the parity. For example, the error correction circuit 45 receives a predetermined unit of data from the RAM 44 via the CPU 41, encodes the received data, and generates the parity to generate the code word. In addition, the error correction circuit 45 decodes the code word read from the NAND memory 5 to restore the data. That is, the error correction circuit 45 performs the error correction on the data read from the NAND memory 5. When the error correction is successful, the error correction circuit 45 stores the error-corrected data in the RAM 44 via the CPU 41. When the error correction fails, the error correction circuit 45 reports to the CPU 41 that the error correction has failed.

The power supply control circuit 6 supplies power to each circuit such as the controller 4 and the NAND memory 5 based on the power supplied from the external power supply 10. The power supply control circuit 6 is, for example, a power management integrated circuit (PMIC). The power supply control circuit 6 controls power supply to each circuit according to instructions from the controller 4.

In this embodiment, the power supply control circuit 6 has two power supply systems. One system is connected to the controller 4 and supplies power to the controller 4. The other system is connected to the NAND memory 5 and supplies power to the NAND memory 5.

FIG. 2 is a diagram illustrating an example of more detailed configuration of the memory system 1 according to this embodiment.

The NAND memory 5 further includes a NAND input output (IO) port 56 and a duty correction circuit 55.

The NAND IO port 56 includes one or more terminals, I/O buffers, or pads. The duty correction circuit 55 is, for example, a delay buffer.

The controller 4 is connected to the NAND memory 5 via a bus 300. The bus 300 is a collection of signal lines. The bus 300 includes a chip enable signal line CEn, a command latch enable signal line CLE, an address latch enable signal line ALE, a write enable signal line WEn, data signal line DQ, a pair of data strobe signal lines DQS/DQSn, and a pair of read enable signal lines RE/REn. These signal lines are connected to the input/output control circuit 51, the page buffer 53, or the duty correction circuit 55 via terminals provided in the NAND IO port 56.

The data signal line DQ is a signal line used for transmitting and receiving a signal DQ. The signal DQ is a command, an address, or data. The data signal line DQ has a bit width of, for example, 8 bits. The bit width of the data signal line DQ is not limited thereto.

The chip enable signal line CEn is a signal line used for transmitting the chip enable signal CEn. The chip enable signal CEn is a signal for enabling a memory chip that is a target of access.

The command latch enable signal line CLE is a signal line used for transmitting the command latch enable signal CLE. The command latch enable signal CLE indicates that the signal DQ is a command. The controller 4 transmits the command latch enable signal CLE when transmitting the command as the signal DQ.

The address latch enable signal line ALE is a signal line used for transmitting the address latch enable signal ALE. The address latch enable signal ALE indicates that the signal DQ is an address. The controller 4 transmits the address latch enable signal ALE when transmitting the address as the signal DQ.

The write enable signal line WEn is a signal line for transmitting the write enable signal WEn. The write enable signal WEn is a timing signal indicating timing of fetching a command or an address transmitted as the signal DQ. Therefore, the command or the address is transmitted in synchronization with the write enable signal WEn. The controller 4 transmits the write enable signal WEn when transmitting the command or the address as the signal DQ.

The pair of the read enable signal lines RE/REn are a pair of signal lines used for transmitting the pair of read enable signals RE/REn. The pair of read enable signals RE/REn are configured as differential signals. In FIG. 2, the pair of read enable signal lines RE/REn are drawn as one line in order to avoid complication of the figure. The pair of read enable signals RE/REn are timing signals at which the controller 4 instructs the NAND memory 5 to output the data with which the controller 4 instructs output timing of the data to the NAND memory 5. Hereinafter, when describing the pair of read enable signals RE/REn, only the read enable signal RE will be referred to, and the referring to the read enable signal REn will be omitted.

The pair of data strobe signal lines DQS/DQSn are a pair of signal lines for transmitting and receiving a pair of data strobe signals DQS/DQSn. The pair of data strobe signals DQS/DQSn are configured as differential signals. In FIG. 2, the pair of data strobe signals DQS/DQSn are drawn as one line in order to avoid complication of the figure. The pair of data strobe signals DQS/DQSn are timing signals for instructing data fetching timing to a transmission destination when transmitting the data. During the write operation, the controller 4 transmits the pair of data strobe signals DQS/DQSn. That is, during the write operation, data is transmitted in synchronization with the pair of data strobe signals DQS/DQSn transmitted by the controller 4. During the read operation, the NAND memory 5 transmits the pair of data strobe signals DQS/DQSn. That is, during the read operation, data is transmitted in synchronization with the pair of data strobe signals DQS/DQSn transmitted by the NAND memory 5. Hereinafter, when describing the pair of data strobe signals DQS/DQSn, only the data strobe signal DQS will be referred to, and the referring to the data strobe signal DQSn will be omitted.

A configuration of the bus 300 is not limited to the example described above. The bus 300 may include any signal lines other than the signal lines described above. Some of the above-mentioned signal lines may be omitted.

The write operation will be described. In the write operation, the controller 4 transmits the write command and the data to the NAND memory 5. The data is transmitted from the controller 4 as the signal DQ. The NAND memory 5 receives the data via the NAND IO port 56. This data is stored in the page buffer 53 at timing based on the data strobe signal DQS received via the NAND IO port 56. After that, the data stored in the page buffer 53 is written from the page buffer 53 to the memory cell array 52.

The read operation will be described. In the read operation, upon receiving the read command and address from the controller 4, the control circuit 54 reads the data from the memory cell array 52 based on the address. The data read from the memory cell array 52 is stored in the page buffer 53. When the data is stored in the page buffer 53, the controller 4 outputs the read enable signal RE. The read enable signal RE is input to the duty correction circuit 55 via the NAND IO port 56. The NAND memory 5 generates the data strobe signal DQS by performing waveform shaping such as duty correction on the read enable signal RE by the duty correction circuit 55. And then, the NAND memory 5 transmits the generated data strobe signal DQS to the controller 4 via the NAND IO port 56. In addition, the NAND memory 5 transmits the data stored in the page buffer 53 as the signal DQ via the NAND IO port 56. This data is synchronized with the generated data strobe signal DQS.

The memory system 1 according to at least one embodiment supplies a high voltage to the NAND memory 5 to destruct the NAND memory 5 when being discarded. This is called a destruct operation. Accordingly, the data stored in the NAND memory 5 will not be read by a third party from the memory system 1 according to at least one embodiment after being discarded.

The destruct operation of the NAND memory 5 will be described. When the memory system 1 receives a destruct command from the host 2, the controller 4 of memory system 1 performs the destruct operation. First, the controller 4 generates a destruction check data and stores the destruction check data in the RAM 44. The controller 4 transmits the destruction check data, the address, and the write command to the NAND memory 5 and performs the write operation. The control circuit 54 writes the destruction check data to the memory cell array 52.

The controller 4 instructs the power supply control circuit 6 to increase the voltage of the power supply system connected to the NAND memory 5. The power supply control circuit 6 allows the voltage of the power supply system connected to the NAND memory 5 to be increased to the destruction voltage. The destruction voltage is a voltage higher than the voltage supplied from the power supply control circuit 6 to the NAND memory 5 when the memory system 1 is connected to the host 2 and operates normally. The destruction voltage is a voltage at which at least a portion of each component of the NAND memory 5 is destructed. For example, when the voltage value when the memory system 1 normally operates is 1.2 V, the destruction voltage value is 10 V.

Next, the memory system 1 determines whether the data can no longer be read from the NAND memory 5. The controller 4 performs the read operation to read the destruction check data from the NAND memory 5. The controller 4 transmits the read command and the address for reading the destruction check data to the NAND memory 5.

Next, the controller 4 checks whether the data has been received from the NAND memory 5. When the NAND memory 5 does not return the data in response to the read command, the controller 4 determines that the NAND memory 5 has been destructed. When the NAND memory 5 returns the data in response to the read command, the controller 4 compares the data returned by the NAND memory 5 with the destruction check data in the RAM 44. When the data returned by the NAND memory 5 does not match the destruction check data, that is, when the read destruction check data is incorrect, the controller 4 determines that the NAND memory 5 has been destructed. When the data returned by the NAND memory 5 and the destruction check data match each other, that is, when the read destruction check data is correct, the controller 4 determines that the NAND memory 5 has not been destructed and performs the destruct operation again. After the controller 4 determines that the NAND memory 5 has been destructed, that is, after the destruct operation is completed, the controller 4 may notify the host 2 of the completion of the destruct operation.

Figure 3:
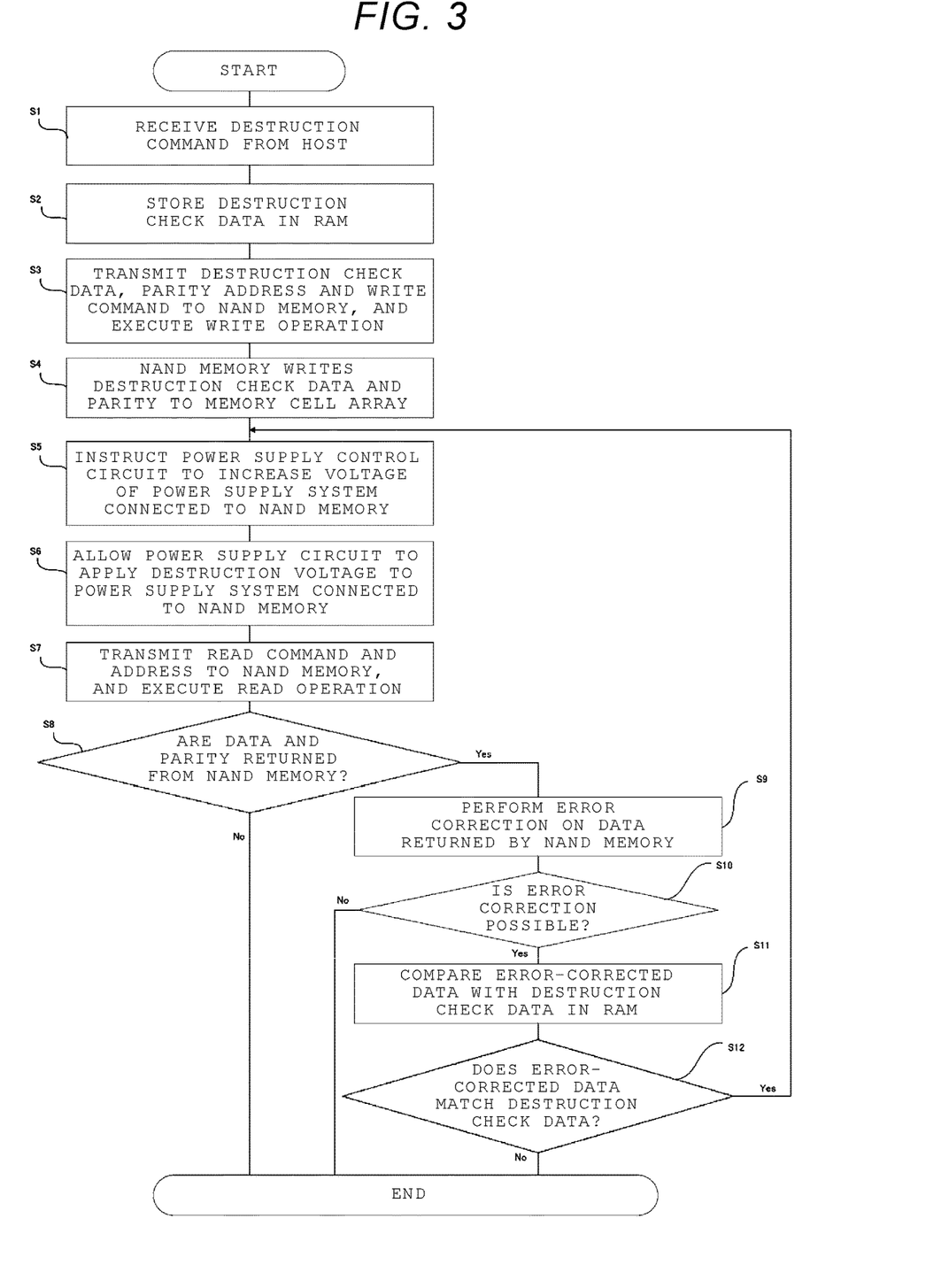
FIG. 3 is a flowchart of breaking operation according to the first embodiment.

FIG. 3 is a flowchart illustrating a procedure of the destruct operation performed in the memory system 1 according to at least one embodiment.

The memory system 1 receives the destruct command from the host 2 (step S1). The controller 4 generates destruction check data and stores the destruction check data in the RAM 44 (step S2). The controller 4 transmits the destruction check data, the parity and address for the destruction check data, and the write command to the NAND memory 5 and performs the write operation (step S3). The control circuit 54 writes the destruction check data and the parity to the memory cell array 52 (step S4).

When the NAND memory 5 completes writing the destruction check data and the parity, the controller 4 instructs the power supply control circuit 6 to increase the voltage of the power supply system connected to the NAND memory 5 (step S5). The power supply control circuit 6 applies the destruction voltage to the power supply system connected to the NAND memory 5 (step S6).

Next, the controller 4 transmits the read command and the address of the destruction check data to the NAND memory 5 and performs the read operation (step S7). When the NAND memory 5 does not return the data and the parity in response to the read command (No in step S8), the controller 4 determines that the NAND memory 5 has been destructed and ends the process. When the NAND memory 5 returns the data and the parity in response to the read command (Yes in step S8), the controller 4 (more specifically, the error correction circuit 45) performs the error correction on the data returned by the NAND memory 5 (step S9). When the error correction is not possible (No in step S10), that is, when the error correction fails, the controller 4 determines that the NAND memory 5 has been destructed and ends the process. When the error correction is possible (Yes in step S10), that is, when the error correction is successful, the controller 4 compares the error-corrected data with the destruction check data in the RAM 44 (step S11). When the error-corrected data and the destruction check data do not match each other (No in step S12), the controller 4 determines that the NAND memory 5 has been destructed and ends the process. When the error-corrected data and the destruction check data match each other (Yes in step S12), the controller 4 determines that the NAND memory 5 has not been destructed, returns to S5 again, and performs the destruct operation.

In addition, when the NAND memory 5 returns the data and the parity in response to the read command (Yes in step S8), the controller 4 may compare the data read from the NAND memory with the destruction check data in RAM 44 (step S11) without performing the error correction steps (steps S9 and S10).

As described above, by applying the high voltage to an internal circuit of the NAND memory 5, the data stored in the NAND memory 5 cannot be read. Accordingly, the memory system 1 can be discarded safely in terms of security.

Modification Example

Figure 4:
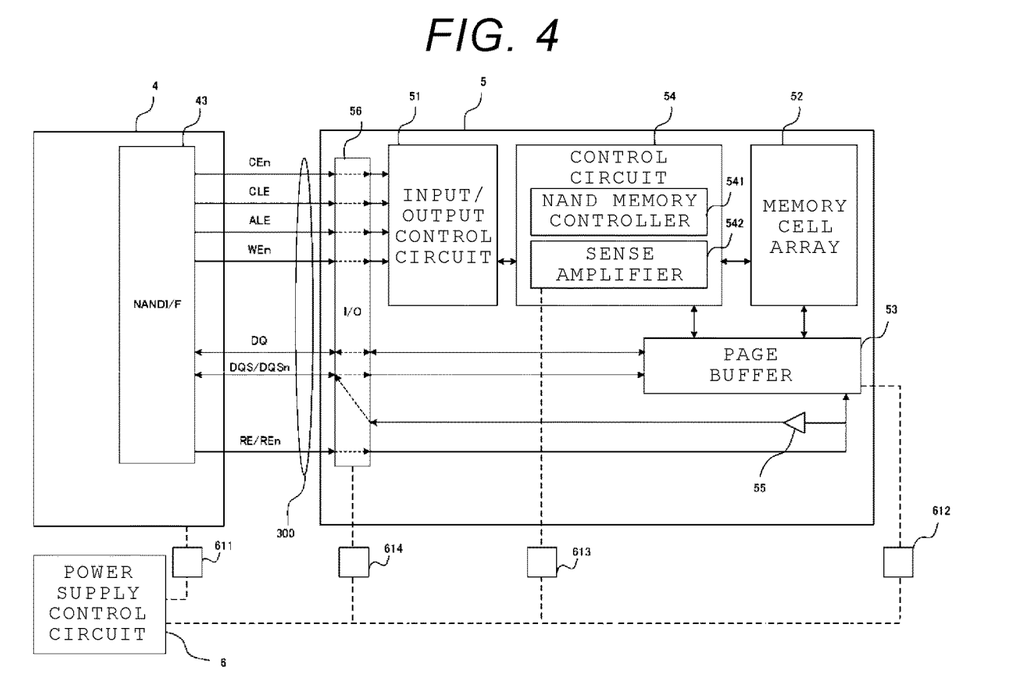
FIG. 4 is a block diagram of the memory system according to Modification Example of the first embodiment.

Next, Modification Example will be described. FIG. 4 is a block diagram illustrating an example of a configuration of the memory system 1 according to Modification Example.

In the first embodiment, the power supply control circuit 6 of the memory system 1 has two power supply systems. In Modification Example, the power supply control circuit 6 may be connected to a plurality of power supply circuits 611 to 614.

In this case, the power supply control circuit 6 can independently control application of voltage to each of a plurality of circuits connected to the power supply circuits 611 to 614.

The power supply circuits 611 to 614 are transformers that convert an input voltage into another voltage. The power supply circuits 611 to 614 are, for example, direct current/ direct current converters (DC/DC converters) or low dropout regulators (LDO regulators). The power supply control circuit 6 and the power supply circuits 611 to 614 are connected via terminals (not illustrated). It is noted that the power supply circuits 611 to 614 may be provided in the power supply control circuit 6.

The controller 4, the page buffer 53, the sense amplifier 542 and the NAND IO port 56 are each independently connected to the power supply control circuit 6, and the power supply circuits 611 to 614 separately apply voltages and stop applying the voltages.

The voltage is applied from the power supply control circuit 6 to the controller 4 via the power supply circuit 611. The voltage is applied from the power supply control circuit 6 to the page buffer 53 via the power supply circuit 612. The voltage is applied from the power supply control circuit 6 to the sense amplifier 542 via the power supply circuit 613. The voltage is applied from the power supply control circuit 6 to the NAND IO port 56 via the power supply circuit 614.

In the destruct operation, the controller 4 selects the power supply circuits 611 to 614 connected to the circuit to which the destructive voltage is to be applied and instructs the power supply control circuit 6 to increase the voltage. The power supply control circuit 6 instructs the selected power supply circuits 611 to 614 to apply the destruction voltage.

The controller 4 may destruct, for example, the NAND IO port 56 in the destruct operation. The controller 4 instructs the power supply control circuit 6 to increase the output voltage from the power supply circuit 614 connected to the NAND IO port 56. The power supply control circuit 6 instructs the power supply circuit 614 to increase the output voltage, and the power supply circuit 614 applies the destruction voltage to the NAND IO port 56. At this time, the controller 4 may not instruct the power supply control circuit 6 to apply the destruction voltage to the memory cell array 52.

As described above, the data stored in the NAND memory 5 cannot be read by specifying the internal circuit of the NAND memory 5 and partially applying the high voltage. This allows the memory system 1 to be discarded safely in terms of security. In addition, by destructing the NAND IO port 56, the data stored in the NAND memory 5 can be allowed not to be read in a shorter time than when the memory cell array 52 is destructed.

The controller 4 destructs the NAND IO port 56 in Modification Example. Alternatively, the page buffer 53, the sense amplifier 542, or the NAND memory controller 541 may be destructed. Due to the destruction of these circuits, the data stored in the NAND memory 5 can be allowed not to be read in a shorter period of time than when the memory cell array 52 is destructed.

Second Embodiment

Figure 5:
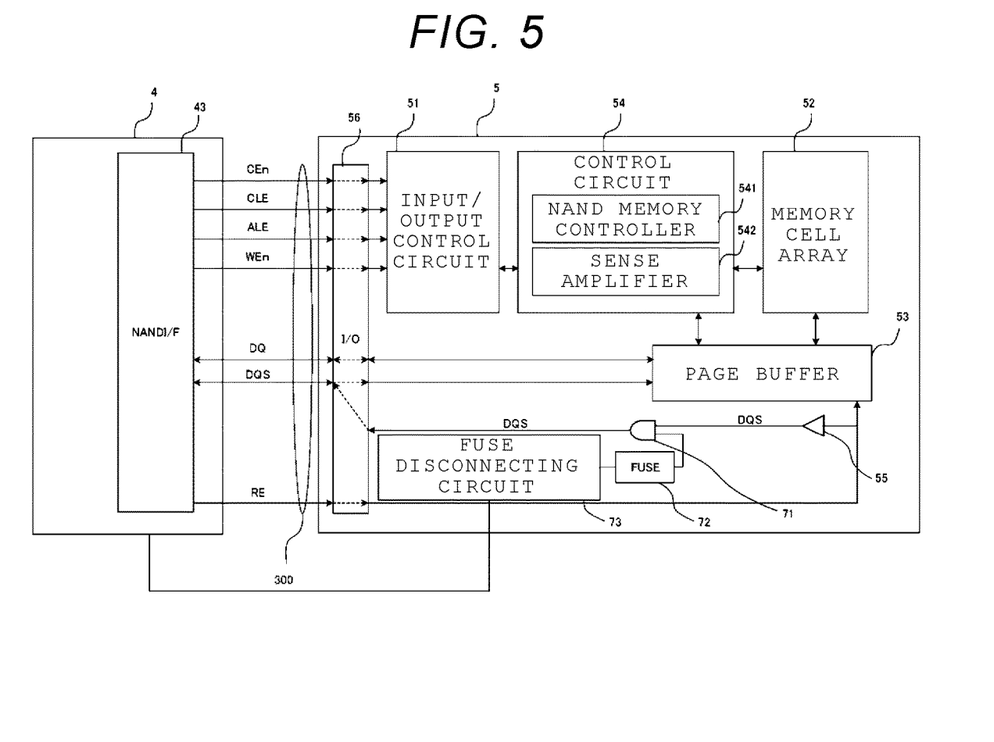
FIG. 5 is a block diagram of a memory system according to a second embodiment.

In the first embodiment, when the memory system 1 is discarded, the destruction voltage is applied to the NAND memory to destruct the NAND memory 5 and prevent the data from being read. The second embodiment is different from the first embodiment in that the memory system 1 further includes an AND circuit, a FUSE circuit, and a FUSE disconnecting circuit. Configurations other than those described below are the same as those of the first embodiment.

A configuration of the memory system according to the second embodiment will be described with reference to FIG. 5.

The NAND memory 5 further includes a AND circuit 71, a FUSE circuit 72, and a FUSE disconnecting circuit 73 between the duty correction circuit 55 and the NAND IO port 56.

The AND circuit 71 is a circuit that performs a logical value operation. A DQS signal from the duty correction circuit and a signal from the FUSE circuit 72 are input to the AND circuit 71.

Before being disconnected, the FUSE circuit 72 always inputs the logical value of 1 to the AND circuit 71. Accordingly, the logical value of the DQS signal output from the AND circuit 71 becomes the same as the logical value of the DQS signal input to the AND circuit 71 from the duty correction circuit 55. The DQS signal output from the AND circuit 71 is input to the controller 4 via the NAND IO port 56.

The FUSE circuit 72 always inputs the logical value of 0 to the AND circuit 71 when disconnected. Accordingly, the logical value of the DQS signal output from the AND circuit 71 is always the logical value of 0 regardless of the logical value of the DQS signal input to the AND circuit 71 from the duty correction circuit 55. In other words, the data strobe signal DQS that instructs the data fetching timing is not transmitted from the NAND memory 5 to the controller 4. Therefore, the controller 4 cannot read the data from the NAND memory 5 after the FUSE circuit 72 is disconnected.

The FUSE disconnecting circuit 73 is a circuit that disconnects the FUSE circuit 72. During the destruct operation, the controller 4 instructs the FUSE disconnecting circuit 73 to disconnect the FUSE circuit 72. The FUSE disconnecting circuit 73 applies a FUSE disconnecting voltage to the FUSE circuit 72 to disconnect the FUSE circuit 72. For example, the FUSE disconnecting voltage is 1.8 V.

Figure 6:
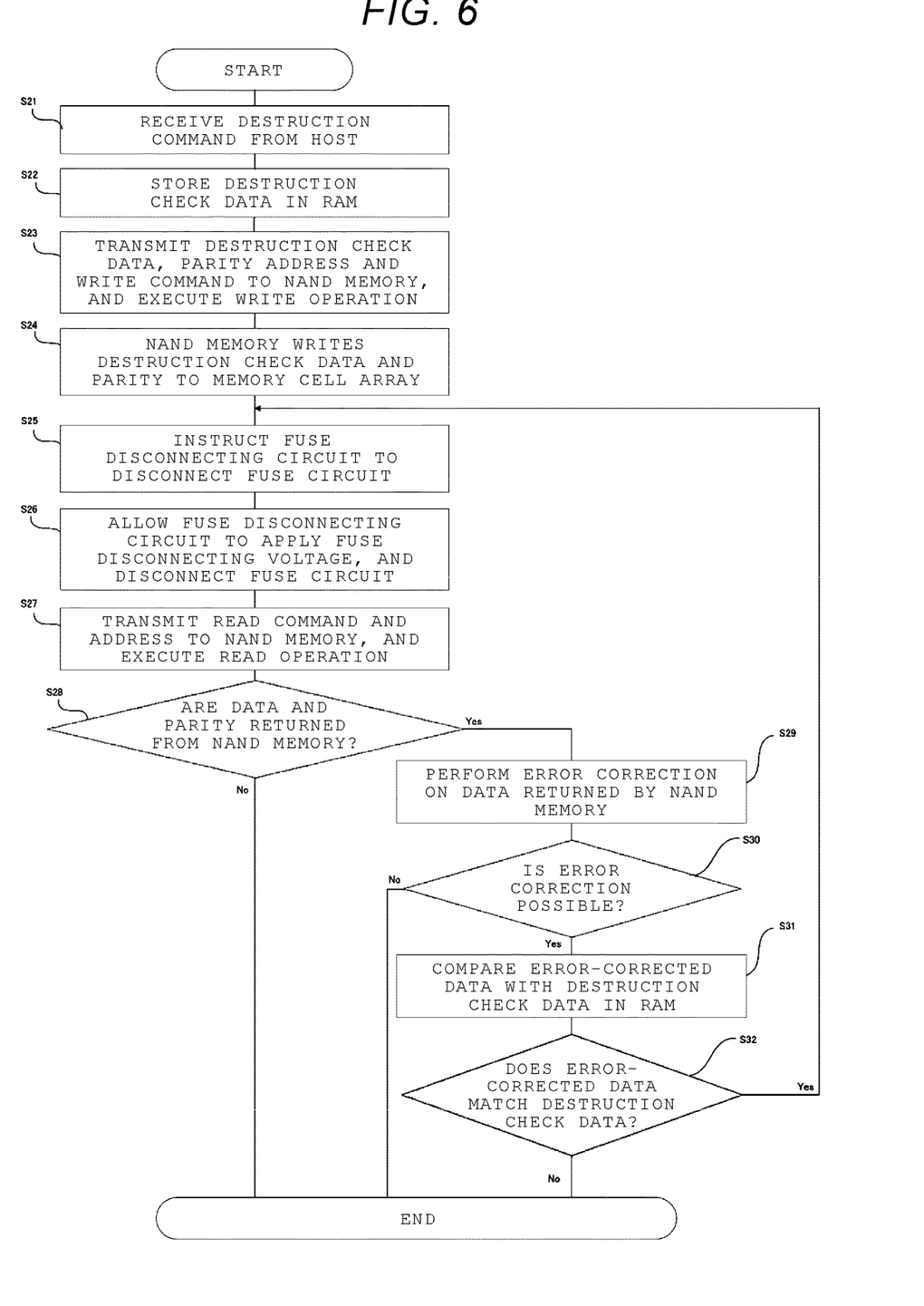
FIG. 6 is a flowchart of breaking operation according to the second embodiment.

A procedure of the destruct operation performed in the memory system 1 according to at least one embodiment will be described with reference to FIG. 6.

The memory system 1 receives the destruct command from the host 2 (step S21). The controller 4 generates destruction check data and stores the destruction check data in the RAM 44 (step S22). The controller 4 transmits the destruction check data, the parity and the address for the destruction check data, and the write command to the NAND memory 5 and performs the write operation (step S23). The control circuit 54 writes the destruction check data and the parity to the memory cell array 52 (step S24).

When the NAND memory 5 completes writing the destruction check data and the parity, the controller 4 instructs the FUSE disconnecting circuit 73 to disconnect the FUSE circuit 72 (step S25). The FUSE disconnecting circuit 73 applies the FUSE disconnecting voltage to the FUSE circuit 72 to disconnect the FUSE circuit 72 (step S26). When the FUSE circuit 72 is disconnected, the logical value of 0 is always input from the FUSE circuit 72 to the AND circuit 71. Accordingly, the logical value of the DQS signal output from the AND circuit 71 and transmitted to the controller 4 is always the logical value of 0.

Next, the controller 4 transmits the read command and the address of the destruction check data to the NAND memory 5 and performs the read operation (step S27). When the NAND memory 5 does not return the data and the parity in response to the read command (No in step S28), the controller 4 determines that the NAND memory 5 has been destructed and ends the process. When the NAND memory 5 returns the data and the parity in response to the read command (Yes in step S28), the controller 4 (more specifically, the error correction circuit 45) performs the error correction on the data returned by the NAND memory 5 (step S29). When the error correction is not possible (No in step S30), that is, when the error correction fails, the controller 4 determines that the NAND memory 5 has been destructed and ends the process. When the error correction is possible (Yes in step S30), that is, when the error correction is successful, the controller 4 compares the error-corrected data with the destruction check data in the RAM 44 (step S31). When the error-corrected data and the destruction check data do not match each other (No in step S32), the controller 4 determines that the NAND memory 5 has been destructed and ends the process. When the error-corrected data and the destruction check data match each other (Yes in step S32), the controller 4 determines that the NAND memory 5 has not been destructed, returns to S25 again, and performs the destruct operation.

It is noted that, when the NAND memory 5 returns the data and the parity in response to the read command (Yes in step S28), the controller 4 may compare the data read from the NAND memory 5 with the destruction check data in the RAM 44 (step S31) without performing the error correction steps (steps S29 and S30).

As described above, by disconnecting the FUSE circuit 72 by the FUSE disconnecting circuit 73 and fixing the DQS signal output from the NAND memory 5, the data stored in the NAND memory 5 cannot be read. For this reason, the memory system 1 can be discarded safely in terms of security. In addition, by fixing the DQS signal of the NAND memory 5, the data of the NAND memory 5 can be allowed not to be read in a shorter period of time than when the memory cell array 52 is destructed.

Modification Example

Figure 7:
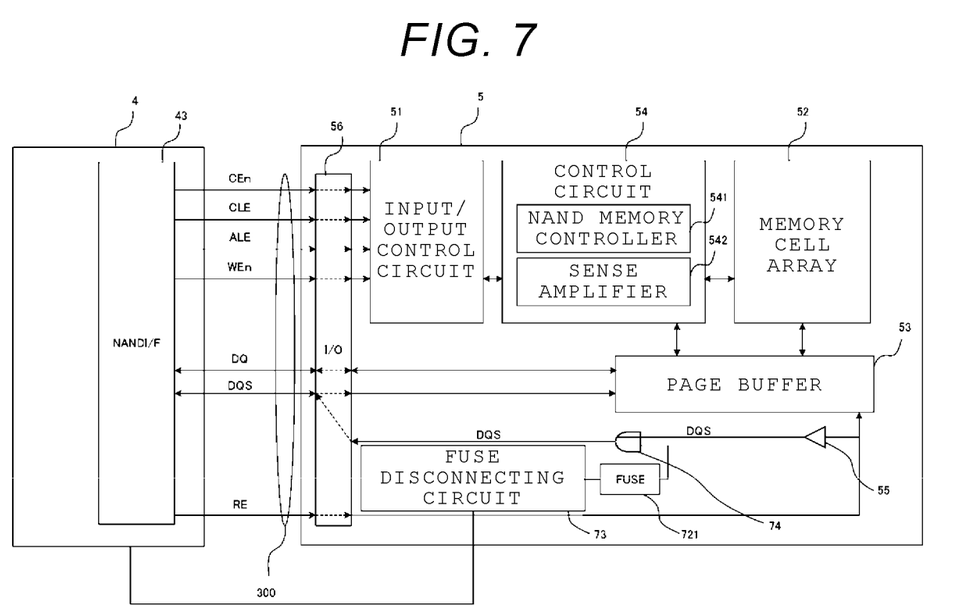
FIG. 7 is a block diagram of a memory system according to Modification Example of the second embodiment.

Next, Modification Example will be described. FIG. 7 is a diagram illustrating an example of a configuration of the memory system 1 according to Modification Example.

In the second embodiment, the NAND memory 5 includes the AND circuit 71. In Modification Example, the NAND memory 5 may include an OR circuit 74.

The NAND memory 5 includes the OR circuit 74, a FUSE circuit 721, and the FUSE disconnecting circuit 73 between the duty correction circuit 55 and the NAND IO port 56.

The OR circuit 74 is a circuit that performs the logical value operation. The DQS signal from the duty correction circuit 55 and the signal from the FUSE circuit 721 are input to the OR circuit 74.

The FUSE circuit 721 always inputs the logical value of 0 to the OR circuit 74 before being disconnected. Accordingly, the logical value of the DQS signal output from the OR circuit 74 becomes the same as the logical value of the DQS signal input to the OR circuit 74 from the duty correction circuit 55. The DQS signal output from the OR circuit 74 is input to the controller 4 via the NAND IO port 56.

The FUSE circuit 721 always inputs the logical value of 1 to the OR circuit 74 when being disconnected. Accordingly, the logical value of the DQS signal output from the OR circuit 74 is always the logical value of 1 regardless of the logical value of the DQS signal input from the duty correction circuit to the OR circuit 74.

The FUSE disconnecting circuit 73 is a circuit that disconnects the FUSE circuit 721. During the destruct operation, the controller 4 instructs the FUSE disconnecting circuit 73 to disconnect the FUSE circuit 721. The FUSE disconnecting circuit 73 applies the FUSE disconnecting voltage to the FUSE circuit 721 to disconnect the FUSE circuit 721.

Also in Modification Example, by disconnecting the FUSE circuit 721 by the FUSE disconnecting circuit 73 and fixing the DQS signal output from the NAND memory 5, the data stored in the NAND memory 5 cannot be read. For this reason, the memory system 1 can be discarded safely in terms of security. In addition, by fixing the DQS signal of the NAND memory 5, the data of the NAND memory 5 can be allowed not to be read in a shorter period of time than when the memory cell array 52 is destructed.

In the second embodiment and Modification Example, the data stored in the NAND memory 5 cannot be read by fixing the DQS signal. However, instead of the DQS signal, for example, the FUSE circuit and the OR circuit may be connected to, for example, the signal line of the CEn signal to fix the CEn signal. In addition, the RE signal may be fixed by connecting the FUSE circuit and the AND circuit or the OR circuit to the signal line of the RE signal.

It is noted that the present disclosure is not limited to the above-described embodiments, and of course various modifications can be made without departing from the spirit of the present disclosure.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a first controller including a first volatile memory;
   a nonvolatile memory connected to the first controller, the nonvolatile memory including a memory cell array, the memory cell array including a plurality of blocks each of which is a unit of erasing data, each of the plurality of blocks including a plurality of pages each of which is a unit of reading data and a unit of writing data;
   a power supply circuit configured to apply a voltage to the first controller and the nonvolatile memory,
   wherein the first controller is configured to:
      receive a first command from a host, the first command instructing to destruct the nonvolatile memory;
      in response to receiving the first command, generate first data for checking the destruction of the nonvolatile memory;
      write the first data to a first address of the nonvolatile memory;
      store the first data in the first volatile memory;
      instruct the power supply circuit to apply a destruction voltage to the nonvolatile memory to destruct at least a portion of a component of the nonvolatile memory outside of the memory cell array;
      instruct the nonvolatile memory to read data from the first address of the nonvolatile memory;
      determine whether the data can be read from the first address of the nonvolatile memory;
      when the data cannot be read, determine that the destruction of the nonvolatile memory is successful;
      when the data can be read, compare the data read from the first address with the first data stored in the first volatile memory;
      when the read data does not match the first data, determine that the destruction of the nonvolatile memory is successful; and
      when the read data matches the first data, instruct the power supply circuit again to apply the destruction voltage to the nonvolatile memory.

2. The memory system according to claim 1,
   wherein the first controller includes a first volatile memory,
   wherein the first controller is configured to store the first data in the first volatile memory and instruct the nonvolatile memory to read data from the first address,
   wherein, when the data can be read, the first controller performs error correction on the data read from the first address,
   wherein, when error correction of the data is successful, the first controller compares the error-corrected data with the first data stored in the first volatile memory, and
   wherein, when the error-corrected data matches the first data, the first controller instructs the power supply circuit again to apply the destruction voltage to the nonvolatile memory.

3. The memory system according to claim 2, wherein, when the data cannot be error-corrected, the first controller determines that destruction of the nonvolatile memory is successful.

4. The memory system according to claim 2, wherein, when the error-corrected data does not match the first data, the first controller determines that destruction of the nonvolatile memory is successful.

5. The memory system according to claim 1, further comprising:
   a bus containing a signal line; and
   a first power circuit,
   wherein the first controller and the nonvolatile memory are connected to each other via the bus,
   wherein the nonvolatile memory includes a port connected to the signal line, and
   wherein the first controller is configured to instruct the power supply control circuit to apply the destruction voltage to the port via the first power circuit.

6. The memory system according to claim 1, further comprising a second power circuit,
   wherein the nonvolatile memory includes a second volatile memory, and
   wherein the first controller is configured to instruct the power supply control circuit to apply the destruction voltage to the second volatile memory via the second power circuit.

7. The memory system according to claim 1, further comprising a third power circuit,
   wherein the nonvolatile memory includes a second controller, and
   wherein the first controller is configured to instruct the power supply circuit to apply the destruction voltage to the second controller via the third power circuit.

8. The memory system according to claim 1,
   wherein the nonvolatile memory includes a plurality of memory cells, and
   wherein, when the first controller instructs the power supply circuit to apply the destruction voltage to the nonvolatile memory, the first controller does not instruct the power supply circuit to apply the destruction voltage to the plurality of memory cells.

9. The memory system according to claim 1, further comprising a first power circuit, and a bus containing a signal line,
   wherein the first controller and the nonvolatile memory are connected to each other via the bus,
   the nonvolatile memory includes a plurality of memory cells, and a port connected to the signal line,
   the first controller is configured to instruct the power supply circuit to apply the destruction voltage to the port via the first power circuit, and not to instruct the power circuit to apply the destruction voltage to the plurality of memory cells.

10. A memory system comprising:
    a first controller connected to a host, the first controller including a first volatile memory;
    a nonvolatile memory connected to the first controller; and
    a power supply circuit configured to apply a voltage to the first controller and the nonvolatile memory, the nonvolatile memory including a memory cell array, the memory cell array including a plurality of blocks each of which is a unit of erasing data, each of the plurality of blocks including a plurality of pages each of which is a unit of reading data and a unit of writing data,
    wherein the first controller is configured to:

receive a first command from the host, the first command instructing to destruct the nonvolatile memory;

in response to receiving the first command, generate first data for checking the destruction of the nonvolatile memory;

write the first data to a first address of the nonvolatile memory;

store the first data in the first volatile memory;

instruct the power supply circuit to increase the voltage applied to the nonvolatile memory to destruct at least a portion of a component of the nonvolatile memory outside of the memory cell array;

instruct the nonvolatile memory to read data from the first address of the nonvolatile memory;

determine whether the data can be read from the first address of the nonvolatile memory;

when the data cannot be read, determine that the destruction of the nonvolatile memory is successful and notify the host of completion of destruction of the nonvolatile memory;

when the data can be read, compare the data read from the first address with the first data stored in the first volatile memory;

when the read data does not match the first data, determine that the destruction of the nonvolatile memory is successful; and when the read data matches the first data, instruct the power supply circuit again to apply the destruction voltage to the nonvolatile memory.

* * * * *